(12) United States Patent
Kim et al.

(10) Patent No.: US 11,630,543 B2
(45) Date of Patent: Apr. 18, 2023

(54) TOUCH SENSOR AND METHOD OF MANUFACTURING THE SAME

(71) Applicant: DONGWOO FINE-CHEM CO., LTD., Jeollabuk-do (KR)

(72) Inventors: Byoung In Kim, Seoul (KR); Cheol Hun Lee, Gyeonggi-do (KR); Chang Gyeong Lim, Incheon (KR); Min Seok Jang, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 17/141,371

(22) Filed: Jan. 5, 2021

(65) Prior Publication Data

US 2021/0208737 A1 Jul. 8, 2021

(30) Foreign Application Priority Data

Jan. 6, 2020 (KR) .......................... 10-2020-0001539

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 2011/0057887 A1* | 3/2011 | Lin | ........................ G06F 3/0446 |
| | | | 345/173 |
| 2018/0157354 A1* | 6/2018 | Blondin | .............. G06F 3/04164 |
| 2019/0004656 A1* | 1/2019 | Hoka | ...................... G06F 3/044 |

FOREIGN PATENT DOCUMENTS

WO WO 2013/063176 A1 5/2013

* cited by examiner

*Primary Examiner* — Brian M Butcher
(74) *Attorney, Agent, or Firm* — The PL Law Group, PLLC

(57) ABSTRACT

A touch sensor according to an embodiment of the present invention includes a substrate layer, first sensing electrode rows and second sensing electrode rows alternately arranged on the substrate layer, first traces extending from left ends of the first sensing electrode rows, the first traces including periodically arranged bent portions, second traces extending from right ends of the second sensing electrode rows, the second traces including periodically arranged bent portions, a first floating trace adjacent to an outermost first trace of the first traces, and a second floating trace adjacent to an outermost second trace of the second traces.

17 Claims, 7 Drawing Sheets

TOUCH SENSOR AND METHOD OF MANUFACTURING THE SAME

CROSS-REFERENCE TO RELATED APPLICATION AND CLAIM OF PRIORITY

This application claims priority to Korean Patent Applications No. 10-2020-0001539 filed on Jan. 6, 2020 in the Korean Intellectual Property Office (KIPO), the entire disclosure of which is incorporated by reference herein.

BACKGROUND

1. Field

The present invention relates to a touch sensor and a method of manufacturing the same. More particularly, the present invention relates to a touch sensor including sensing electrodes and traces and a method of manufacturing the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

Recently, as the image display device having a large-scaled screen is being developed, an area of the touch sensor disposed under the display screen may be also increased. In this case, a large number of sensing electrodes is included in a single touch sensor, and thus an area of an exposure apparatus and/or an exposure mask for a formation of electrode patterns is also increased. However, predetermined process equipment may not be easily modified.

Further, in a fabrication of a thin film type touch sensor, when the sensing electrodes are simultaneously formed or transferred in a large-scaled area, defects such as a tearing and a wrinkle of a base film may be caused.

For example, as disclosed in Korean Patent Application Publication No. 2014-0092366, various image display devices combined with a touch screen panel including a touch sensor has been developed recently. However, a proper process for the image display device having the large-scaled screen is not suggested.

SUMMARY

According to an aspect of the present invention, there is provided a touch sensor having improved process reliability and efficiency.

According to an aspect of the present invention, there is provided a method of manufacturing a touch sensor having improved process reliability and efficiency.

According to an aspect of the present invention, there is provided an image display device including the touch sensor.

The above aspects of the present inventive concepts will be achieved by the following features or constructions:

(1) A touch sensor, including: a substrate layer; first sensing electrode rows and second sensing electrode rows alternately arranged on the substrate layer; first traces extending from left ends of the first sensing electrode rows, the first traces including periodically arranged bent portions; second traces extending from right ends of the second sensing electrode rows, the second traces including periodically arranged bent portions; a first floating trace adjacent to an outermost first trace of the first traces; and a second floating trace adjacent to an outermost second trace of the second traces.

(2) The touch sensor according to the above (1), wherein the first floating trace comprises a plurality of first floating traces having different lengths.

(3) The touch sensor according to the above (2), wherein the first floating traces become shorter in a direction toward a left side of the substrate layer.

(4) The touch sensor according to the above (1), wherein the second floating trace comprises a plurality of second floating traces having different lengths.

(5) The touch sensor according to the above (4), wherein the second floating traces become shorter in a direction toward a right side of the substrate layer.

(6) The touch sensor according to the above (1), further including: sensing column electrodes disposed between the first sensing electrode row and the second sensing electrode row neighboring each other; and a bridge electrode electrically connecting sensing column electrodes neighboring each other of the sensing column electrodes.

(7) The touch sensor according to the above (6), further including a column trace connected to a sensing column electrode included in a terminal region of the substrate layer among the sensing column electrodes.

(8) The touch sensor according to the above (1), wherein each of the first traces and the second traces has a stepped shape.

(9) The touch sensor according to the above (1), wherein the bent portions included in the first traces and the second traces have an oblique line shape.

(10) A method of manufacturing a touch sensor, comprising: forming a first sensing electrode row, a second sensing electrode row, a first sub-trace extending from a left end of the first sensing electrode row, a first floating sub-trace disposed around the first sub-trace, a second sub-trace extending from a right end of the second sensing electrode row and a second floating sub-trace disposed around the second sub-trace on a substrate layer by a pattering process using a photo-mask; and repeating the patterning process by moving the photo-mask.

(11) The method according to the above (10), wherein a plurality of the first floating sub-traces arranged along a left direction with respect to the first sub-trace are formed by the patterning process, and a plurality of the second floating sub-traces arranged along a right direction with respect to the second sub-trace are formed by the patterning process.

(12) The method according to the above (11), wherein a first sub-trace formed in an $n^{th}$ patterning process is connected to a first floating sub-trace adjacent to the first sub-trace among first floating sub-traces formed in an $n+1^{th}$ patterning process, and n is an integer greater than or equal to 2.

(13) The method according to the above (11), wherein a first floating sub-trace adjacent to the first sub-trace among first floating sub-traces formed in an $n^{th}$ patterning process is connected to an outermost first floating sub-trace among first floating sub-traces formed in an n+1$^{th}$ patterning process, and n is an integer greater than or equal to 2.

(14) The method according to the above (11), wherein a second sub-trace formed in an n$^{th}$ patterning process is connected to a second floating sub-trace adjacent to the second sub-trace among second floating sub-traces formed in an n+1$^{th}$ patterning process, and n is an integer greater than or equal to 2.

(15) The method according to the above (11), wherein a second floating sub-trace adjacent to the second sub-trace among second floating sub-traces formed in an n$^{th}$ patterning process is connected to an outermost second floating sub-trace among second floating sub-traces formed in an n+1$^{th}$ patterning process, and n is an integer greater than or equal to 2.

(16) The method according to the above (11), wherein sensing column electrodes spaced apart from each other are further formed between the first sensing electrode row and the second sensing electrode row by the patterning process.

(17) A window stack structure, comprising: a window substrate; the touch sensor according the embodiments as described above stacked on the window substrate; and a polarizing layer disposed between the window substrate and the touch sensor or disposed on the touch sensor.

(18) An image display device, comprising: a display panel; and the touch sensor according to the embodiments as described above stacked on the display panel.

According to embodiments of the present invention, in a fabrication of a large-area touch sensor, sensing electrode blocks including a plurality of sensing electrode rows may be sequentially patterned or transferred using a photo mask. Thus, the large-area touch sensor may be efficiently manufactured without changing or increasing an exposure/patterning equipment.

In exemplary embodiments, traces extending from the sensing electrode rows may be alternately distributed on both lateral portions of the touch sensor. Additionally, while the sensing electrode block is formed by moving the photo mask, a patterning process may be performed so that traces included in neighboring sensing electrode blocks may be connected or merged with each other. Accordingly, the traces may be formed together with the sensing electrodes while increasing a patterning or an alignment margin for the trace formation.

DETAILED DESCRIPTION

According to exemplary embodiments of the present invention, there is provided a touch sensor including traces connected by a stitch-type method and a method of manufacturing the same. Further, a window stack structure and an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, two directions that are parallel to the same plane are defined as a first direction and a second direction. For example, the first direction may correspond to a row direction and the second direction may correspond to a column direction.

The terms "first", "second", "third", "left" and "right", etc., used herein are intended to relatively designate different regions, steps and elements, and not to indicate absolute order and positions.

The term "patterning" used herein includes an exposure process and an etching process using a photo-mask.

Figure 1:
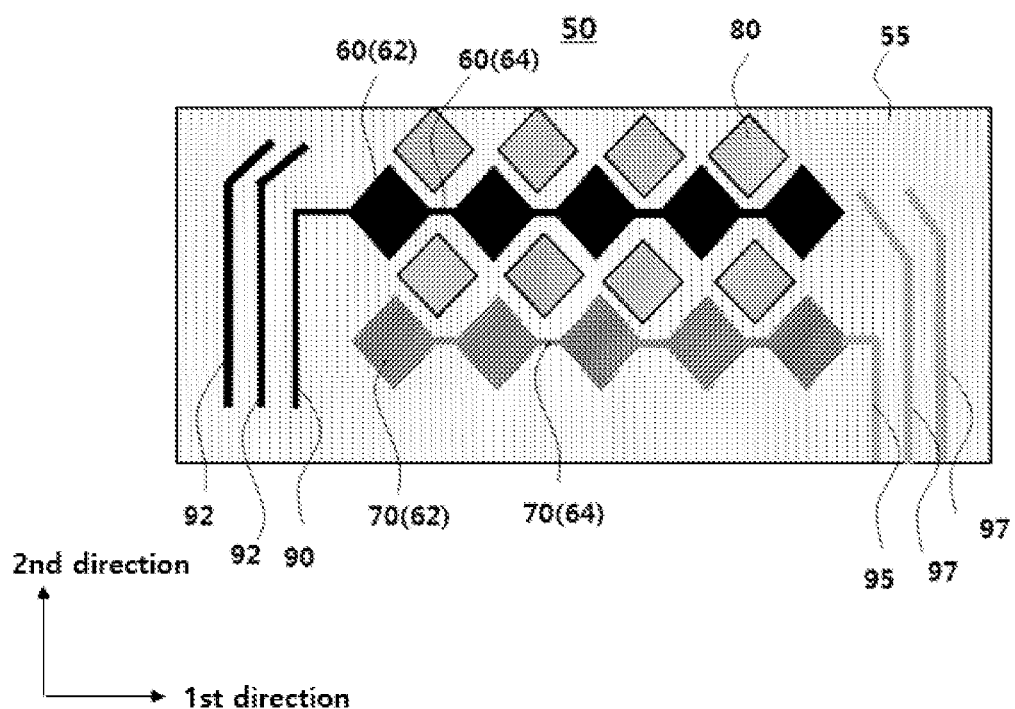
FIG. 1 is a schematic top planar view illustrating a photo-mask in accordance with exemplary embodiments.

FIG. 1 is a schematic top planar view illustrating a photo-mask in accordance with exemplary embodiments.

Referring to FIG. 1, a photo-mask 50 may include a blank portion 55, sensing row pattern portions 60 and 70, a sensing column pattern portion 80 and trace pattern portions 90, 92, 95 and 97.

The blank portion 55 may refer to a portion of the photo-mask 50 excluding the sensing row pattern portions 60 and 70, the sensing column pattern portion 80 and the trace pattern portions 90, 92, 95 and 97.

In some embodiments, the blank portion 55 may serve as a transmissive portion during a photo process or an exposure process, and a remaining portion of the photo mask 50 may serve as a light-shielding portion. In this case, the sensing row pattern portions 60 and 70, the sensing column pattern portion 80 and the trace pattern portions 90, 92, 95 and 97 may be transferred to a photoresist layer (e.g., a positive-type photoresist layer) to form a photoresist pattern, and a conductive layer may be etched using the photoresist pattern as an etching mask to form an electrode pattern of the touch sensor.

In some embodiments, the blank portion 55 may serve as a light-shielding portion, and an remaining portion of the photo-mask 50 may serve as a transmissive portion. In this case, a photoresist pattern to which the sensing row pattern portions 60 and 70, the sensing column pattern portion 80 and the trace pattern portions 90, 92, 95, and 97 are transferred may be formed using a negative-type photoresist layer.

In exemplary embodiments, the photo-mask 50 may include a plurality of the sensing row pattern portions 60 and 70. In some embodiments, the photo-mask 50 may include a first sensing row pattern portion 60 and a second sensing row pattern portion 70.

The sensing row pattern portions 60 and 70 may include a plurality of sensing row electrode portions 62 and connecting pattern portions 64. The sensing row electrode portions 62 may be integrally connected with the connecting pattern portions 64 to extend in the first direction (e.g., a row direction). A plurality of the sensing row pattern portions 60 and 70 may be arranged along the second direction (e.g., a column direction).

The sensing column pattern portions 80 may each be provided as sensing column unit electrode portions that are independently spaced apart from each other. The sensing column pattern portions 80 may be arranged between the sensing row electrode portions 62 neighboring each other.

Sub-trace pattern portions 90 and 95 may be connected to one ends of the sensing row pattern portions 60 and 70.

In exemplary embodiments, a first sub-trace pattern portion 90 may be connected to one end of the first sensing row pattern portion 60. A second sub-trace pattern portion 95 may be connected to one end of the second sensing row pattern portion 70.

The sub-trace pattern portions 90 and 95 may be distributed and alternately disposed on both lateral portions of the photo-mask 50. For example, the first sub-trace pattern portion 90 is connected to a left end of the first sensing row pattern portion 60, and the second sub-trace pattern part 95 may be connected to a right end of the second sensing row pattern portion 70.

A first floating sub-trace pattern portion 92 may be disposed to be adjacent to the first sub-trace pattern portion 90 in a left direction. In exemplary embodiments, the two first floating sub-trace pattern portions 92 may be spaced apart from the first sub-trace pattern portion 90 and arranged in the left direction.

A second floating sub-trace pattern portion 97 may be disposed to be adjacent to the second sub-trace pattern portion 95 in a right direction. In exemplary embodiments, the two second floating sub-trace pattern portions 97 may be spaced apart from the second sub-trace pattern portion 95 and arranged in a right direction.

The term "left", "right" used herein are intended to designate two horizontal and opposite directions relatively, and not to be interpreted as absolute directions.

In FIG. 1, two sensing row pattern portions 60 and 70 are included in the photo mask 50, but 2n (n is a natural number) sensing row pattern portions may be included in the photo-mask 50. In this case, the first sensing row pattern portion 60 and the second sensing row pattern portion 70 are alternately disposed along the second direction, and the first sub-trace pattern portion 90 and the second sub-trace pattern portion 95 may be alternately arranged on a left lateral portion and a right lateral portion of the photo-mask 50 along the second direction.

FIGS. 2 to 6 are schematic top planar views illustrating a method of manufacturing a touch sensor in accordance with exemplary embodiments.

Figure 2:
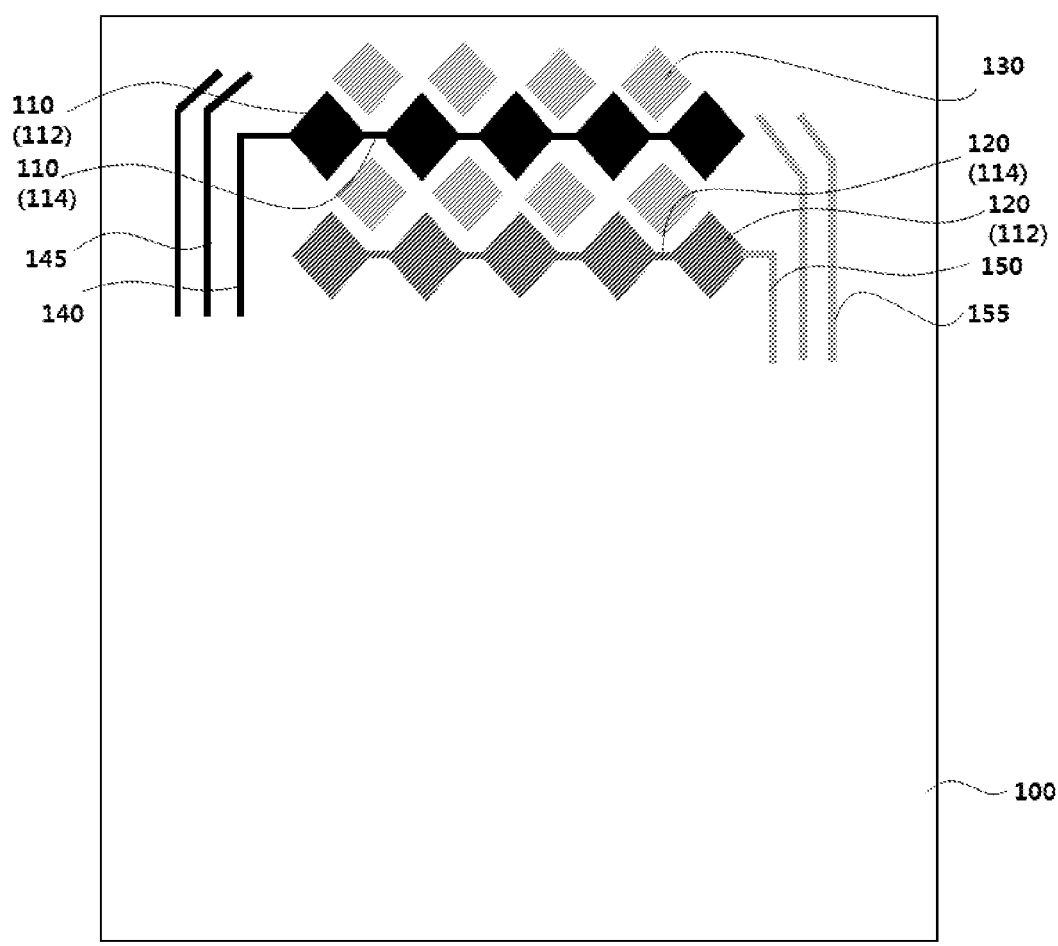
FIGS. 2 to 6 are schematic top planar views illustrating a method of manufacturing a touch sensor in accordance with exemplary embodiments.

Referring to FIG. 2, electrode patterns may be patterned on a substrate layer 100 by using the photo-mask 50 as described with reference to FIG. 1 (e.g., a first patterning process).

The substrate layer 100 may include glass or a transparent resin film. The transparent resin film may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc.

Through the first patterning process, the first sensing row pattern portion 60 and the second sensing row pattern portion 70 of the photo-mask 50 may be transferred as a first sensing electrode row 110 and a second sensing electrode row 120, respectively. The first sensing electrode row 110 and the second sensing electrode row 120 may each include first sensing row electrodes 112 and connecting portions 114. The first sensing row electrodes 112 and the connecting portions 114 may be transferred from the sensing row electrode portions 62 and the connecting pattern portions 64 of the photo-mask 50, respectively.

The sensing column pattern portions 80 of the photo-mask 50 may be transferred into sensing column electrodes 130 having unit electrodes shape that are spaced apart from each other.

The first sub-trace pattern portion 90 and the second sub-trace pattern portion 95 of the photo-mask 50 may be transferred into a first sub-trace 140 and a second sub-trace 150, respectively.

The first sub-trace 140 may be connected to a left end of the first sensing electrode row 110, and the second sub-trace 150 may be connected to a right end of the second sensing electrode row 120.

First floating sub-traces 145 transferred from the first floating sub-trace pattern portions 92 of the photo-mask 50 may be disposed in a left direction from the first sub-trace 140. Second floating sub-traces 155 transferred from the second floating sub-trace pattern portions 97 of the photo-mask 50 may be disposed in a right direction from the second sub-trace 150.

Figure 3:
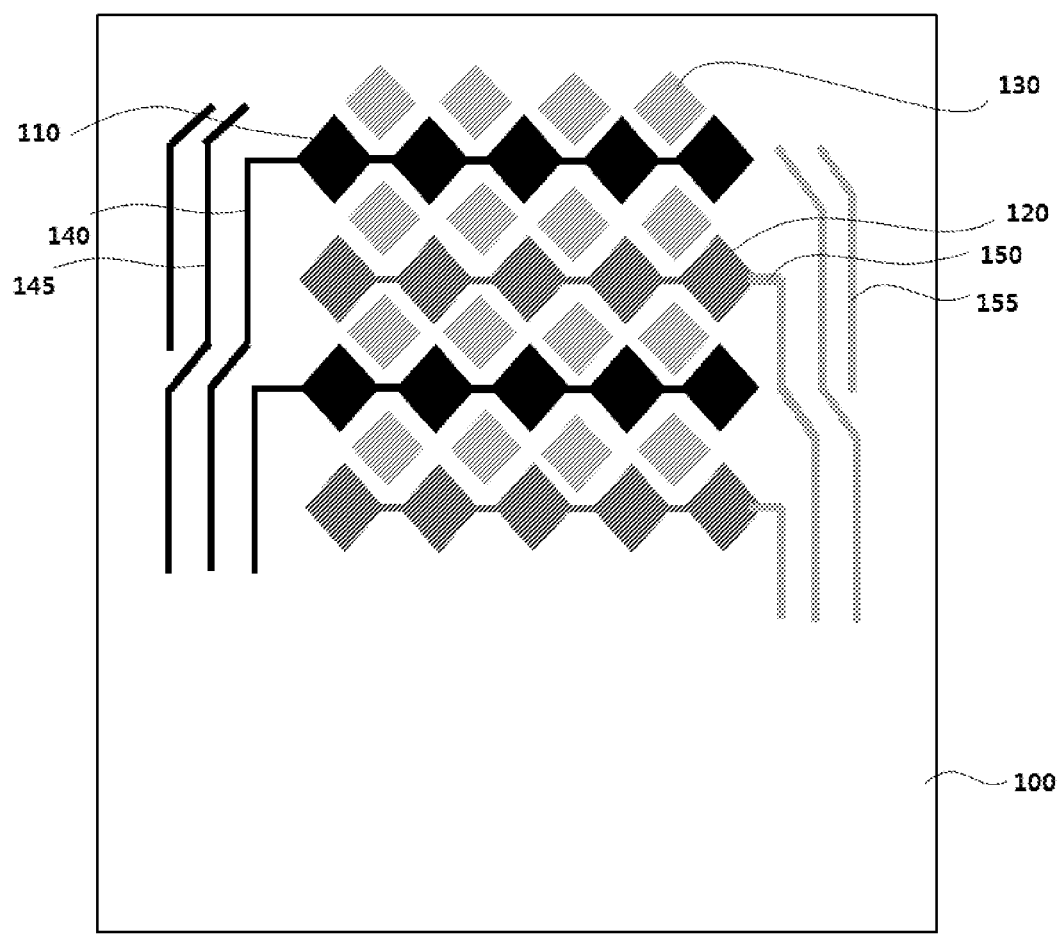

Referring to FIG. 3, a patterning process may be performed again by moving the photo-mask 50 in the second direction by a pitch corresponding to a length of the photo-mask 50 (e.g., a second patterning process).

In the second patterning process, the first sensing electrode row 110 and the second sensing electrode row 120 may be added along the second direction. Additionally, the sensing column electrodes 130 may be added between the first sensing electrode row 110 and the second sensing electrode row 120.

In exemplary embodiments, the first sub-trace 140 formed in the first patterning process may be connected to the first floating sub-trace 145 formed in the second patterning process. Additionally, the first floating sub-trace 145 adjacent to the first sub-trace 140 among the first floating sub-traces 145 formed in the first patterning process may be connected to an outermost first floating sub-trace 145 formed in the second patterning process.

Further, the second sub-trace 150 formed in the first patterning process may be connected to the second floating sub-trace 155 formed in the second patterning process. Additionally, the second floating sub-trace 155 adjacent to the second sub-trace 150 among the second floating sub-traces 155 formed in the first patterning process may be connected to an outermost second floating sub-trace 155 formed in the second patterning process.

Figure 4:
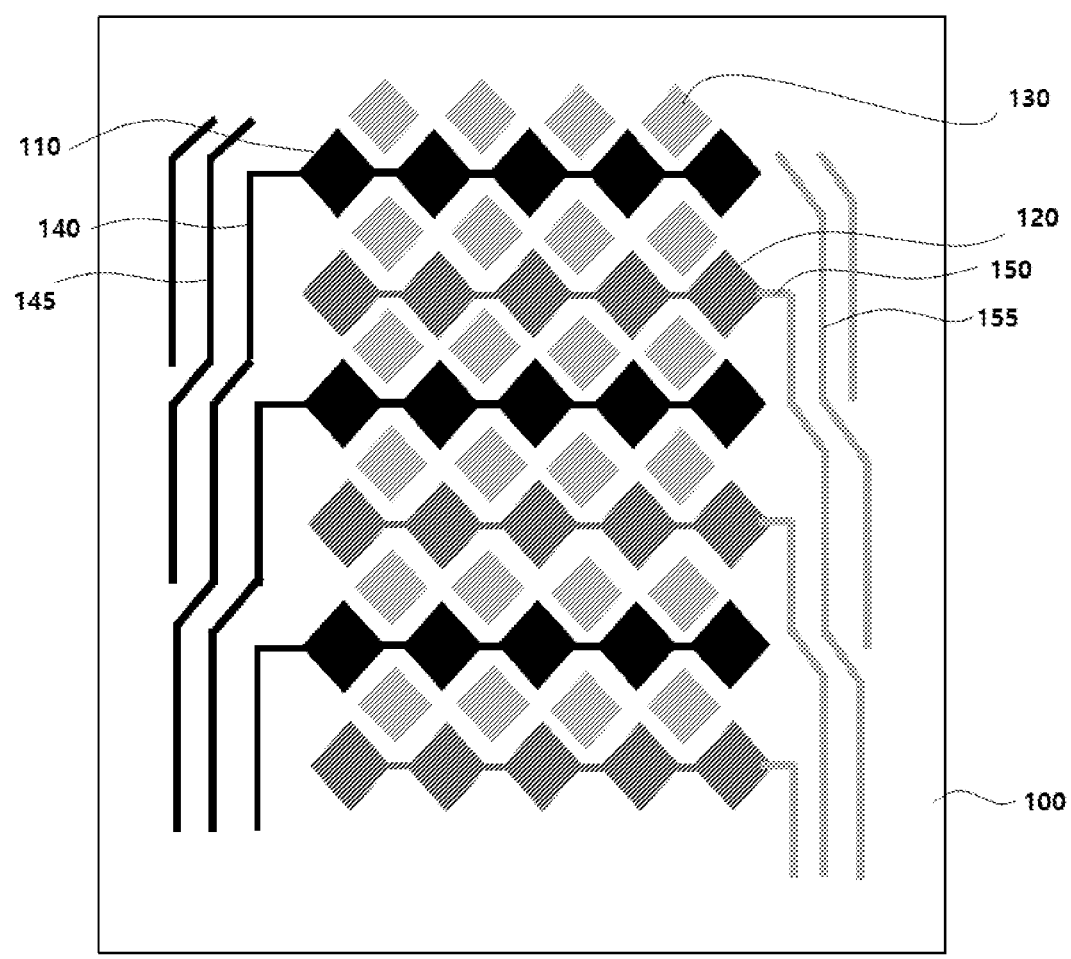

Referring to FIG. 4, a patterning process may be performed again by moving the photo-mask 50 in the second direction by a pitch corresponding to a length of the photo-mask 50 (e.g., a third patterning process).

In the third patterning process, the first sensing electrode row 110 and the second sensing electrode row 120 may be added along the second direction. Additionally, the sensing column electrodes 130 may be added between the first sensing electrode row 110 and the second sensing electrode row 120.

In exemplary embodiments, the first sub-trace 140 formed in the second patterning process may be connected to the first floating sub-trace 145 formed in the third patterning process. Additionally, the first floating sub-trace 145 adjacent to the first sub-trace 140 among the first floating sub-traces 145 formed in the second patterning process may be connected to an outermost first floating sub-trace 145 formed in the third patterning process.

Further, the second sub-trace 150 formed in the second patterning process may be connected to the second floating sub-trace 155 formed in the third patterning process. Additionally, the second floating sub-trace 155 adjacent to the second sub-trace 150 among the second floating sub-traces 155 formed in the second patterning process may be connected to an outermost second floating sub-trace 155 formed in the third patterning process.

As described above, the patterning process using the photo-mask 50 may be repeated so that the sensing electrode rows 110 and 120 and the sensing column electrodes 130 may be sequentially added, while extending the traces to be connected to each other in a stich-type method.

For example, a sub-trace formed in an $n^{th}$ (n is an integer greater than or equal to 2) patterning process may be connected to an inner floating sub-trace among floating sub-traces formed in an $(n+1)^{th}$ patterning process. Further, the inner floating sub-trace formed in the $n^{th}$ patterning process may be connected to an outermost floating sub-trace formed in the $(n+1)^{th}$ patterning process.

Figure 5:
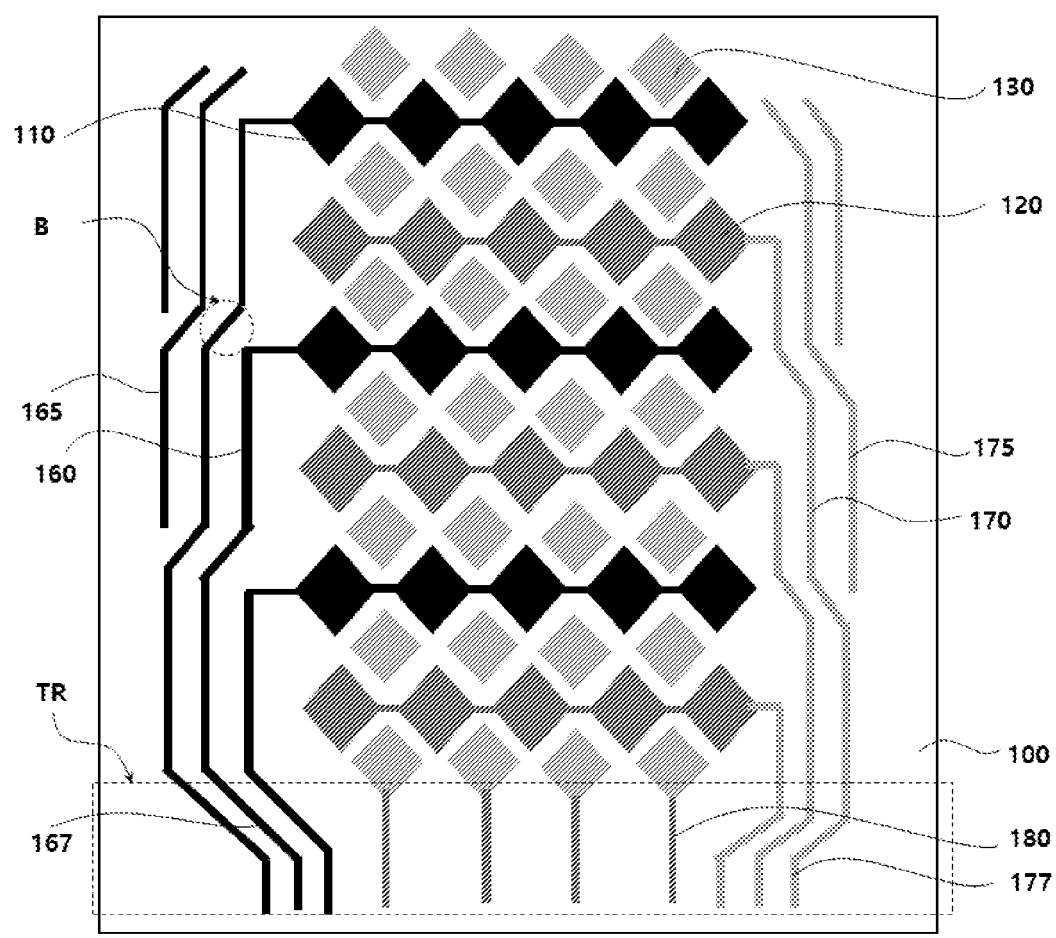

Referring to FIG. 5, the above-described patterning processes may be repeated to form first traces 160 and second traces 170 extending from a left end of the first sensing electrode row 110 and a right end of the second sensing electrode row 120, respectively. The first traces 160 and second traces 170 may be formed by a combination of the sub-traces 140 and 150 and the floating sub-traces 145 and 155.

A first floating trace 165 may be disposed around an outermost first trace 160 of the first traces 160. A second floating trace 175 may be disposed around an outermost second trace 170 of the second traces 170.

In some embodiments, as illustrated in FIG. 5, a plurality of the first floating traces 165 having different lengths may be disposed on a left lateral portion of the substrate layer 100. For example, the lengths of the first floating traces 165 may become smaller in a direction toward a left side of the substrate layer 100.

A plurality of the second floating traces 175 having different lengths may be disposed on a right lateral portion of the substrate layer 100. For example, the lengths of the second floating traces 175 may become smaller in a direction toward a right side of the substrate layer 100.

The floating traces 165 and 175 may be disposed on both lateral portions of the touch sensor and may serve as a noise shielding wiring or a ground wiring.

The traces 160 and 170 and the floating traces 165 and 175 may include bent portions B as indicated by a dotted circle. Accordingly, the traces 160 and 170 and the floating traces 165 and 175 have a stepped shape, and thus an integration efficiency of the traces may be improved.

In exemplary embodiments, the bent portions B may be periodically arranged in each of the traces 160 and 170 or the floating traces 165 and 175. The bent portion B may have, e.g., an oblique line shape.

For example, a terminal portion patterning process may be additionally performed so that end portions of the traces 160 and 170 may be formed in a terminal region TR indicated by a dotted rectangle in FIG. 5.

Accordingly, a first end portion 167 of the first trace 160 may be formed, and a second end portion 177 of the second trace 170 may be formed. A column trace 180 connected to the sensing column electrode 130 disposed in the terminal region TR among the sensing column electrodes 130 may be formed together with the formation of the first end portion 167 and the second end portion 177.

Figure 6:
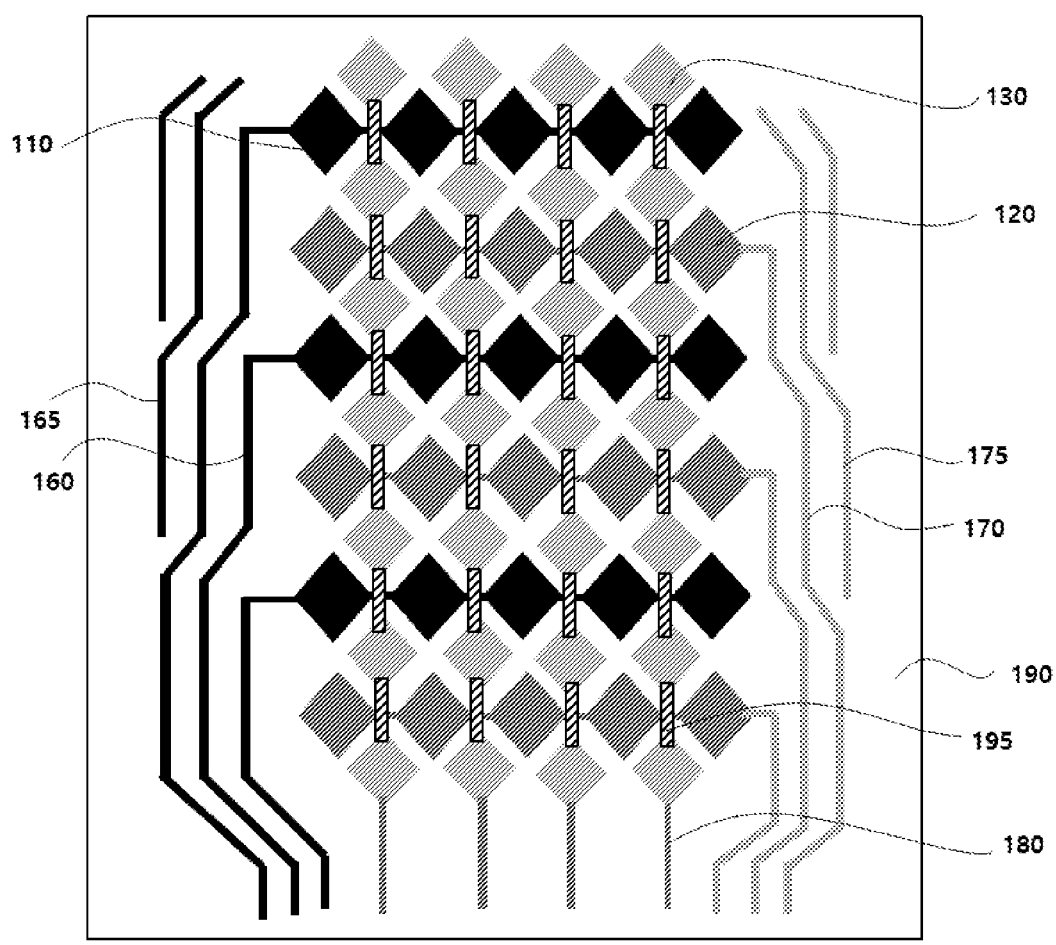

Referring to FIG. 6, an insulating layer 190 covering the sensing electrode rows 110 and 120, the sensing column electrodes 130, the traces 160, 170 and 180 and the floating traces 165 and 175 may be formed (for convenience of descriptions, a clear illustration of the insulating layer 190 is omitted).

A bridge electrode 195 may be formed on the insulating layer 190 to electrically connect the sensing column electrodes 130 neighboring in the second direction. The bridge electrode 195 may be formed through the insulating layer 190 and may be connected to the neighboring sensing column electrodes 130.

The sensing column electrodes 130 arranged in the second direction and spaced apart from each other may be connected to each other by the bridge electrodes 195 such that a sensing electrode column may be defined. A plurality of the sensing electrode columns may be arranged along the first direction.

According to the above-described embodiments of the present invention, sensing electrode blocks including a plurality of sensing electrode rows 110 and 120 may be sequentially patterned or transferred using the photo-mask. Thus, a large area touch sensor may be fabricated without changing or expanding an exposure/patterning equipment.

Further, the traces 160 and 170 extending from the sensing electrode rows 110 and 120 may be alternately distributed on both lateral portions of the touch sensor. When the sensing electrode block is formed by moving the photo-mask, a patterning process may be performed such that the sub-traces and the floating sub-traces included in neighboring sensing electrode blocks may be connected or merged with each other. Accordingly, the traces 160 and 170 may be efficiently formed together with the sensing electrodes while increasing a patterning or alignment margin for forming the traces.

Figure 7:
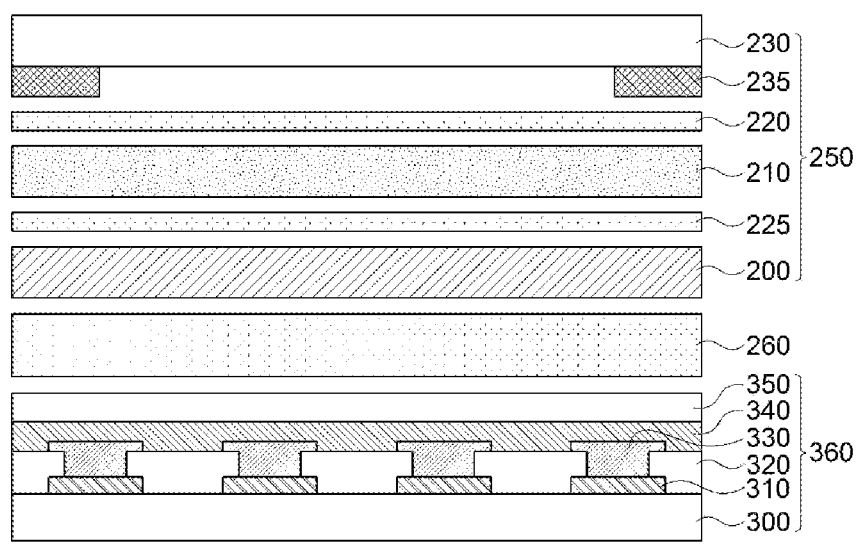
FIG. 7 is a schematic cross-sectional view illustrating a window stack structure and an image display device in accordance with exemplary embodiments.

FIG. 7 is a schematic cross-sectional view illustrating a window stack structure and an image display device in accordance with exemplary embodiments.

Referring to FIG. 7, a window stack structure 250 may include a window substrate 230, a polarizing layer 210 and a touch sensor 200 according to exemplary embodiments as described above.

The window substrate 230 may include a flexible resin film formed of, e.g., polyimide or a glass film such as an ultra-thin glass (UTG). In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may include a large area structure obtained by a plurality of patterning processes according to exemplary embodiments as described above. The touch sensor 200 may be included in the window stack structure 250 as a film or a panel. In an embodiment, the touch sensor 200 may be combined with the polarizing layer 210 via a second adhesive layer 225.

As illustrated in FIG. 7, the window substrate 230, the polarizing layer 210 and the touch sensor 200 may be sequentially positioned from a viewer's side. In this case, the sensing electrodes of the touch sensor 200 may be disposed under the polarizing layer 210 so that electrode patterns may be effectively prevented from being recognized by the viewer.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

As described above, the window substrate 230, the touch sensor 200 and the polarizing layer 210 may be provided as a single stack structure. However, the touch sensor 200 may be provided as independent structure, or a structure combined with the widow substrate 230 or the polarizing layer 210.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and an insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

According to exemplary embodiments, even though an area of the display panel 360 increases, the touch sensor 200 including a large sensing area or active area may be easily applied without an excessive change of process equipment or an excessive increase in cost.

What is claimed is:

1. A touch sensor, comprising:
   a substrate layer;
   first sensing electrode rows and second sensing electrode rows alternately arranged on the substrate layer;
   first traces extending from left ends of the first sensing electrode rows, the first traces including periodically arranged bent portions;
   second traces extending from right ends of the second sensing electrode rows, the second traces including periodically arranged bent portions;
   a first floating trace adjacent to an outermost first trace in a left direction of the first traces, the first floating trace located in the left direction with respect to the outermost first trace;
   a second floating trace adjacent to an outermost second trace in a right direction of the second traces, the second floating trace located in the right direction with respect the outermost second trace in the right direction;
   sensing column electrodes disposed between the first sensing electrode row and the second sensing electrode row neighboring each other; and
   a bridge electrode electrically connecting sensing column electrodes neighboring each other of the sensing column electrodes,
   wherein the first floating trace and the second floating trace are spaced apart from each other with the first sensing electrode rows, the second sensing electrode rows, the first traces and the second traces therebetween, and the second floating trace is spaced apart from the first floating trace in the right direction.

2. The touch sensor according to claim 1, wherein the first floating trace comprises a plurality of first floating traces having different lengths.

3. The touch sensor according to claim 2, wherein the first floating traces become shorter in a direction toward a left side of the substrate layer.

4. The touch sensor according to claim 1, wherein the second floating trace comprises a plurality of second floating traces having different lengths.

5. The touch sensor according to claim 4, wherein the second floating traces become shorter in a direction toward a right side of the substrate layer.

6. The touch sensor according to claim 1, further comprising a column trace connected to a sensing column electrode included in a terminal region of the substrate layer among the sensing column electrodes.

7. The touch sensor according to claim 1, wherein each of the first traces and the second traces has a stepped shape.

8. The touch sensor according to claim 1, wherein the bent portions included in the first traces and the second traces have an oblique line shape.

9. A method of manufacturing a touch sensor, comprising:
   forming a first sensing electrode row, a second sensing electrode row, a first sub-trace extending from a left end of the first sensing electrode row, a first floating sub-trace disposed around the first sub-trace in a left direction, a second sub-trace extending from a right end of the second sensing electrode row and a second floating sub-trace disposed around the second sub-trace in a right direction on a substrate layer by a pattering process using a photo-mask; and
   repeating the patterning process by moving the photo-mask, and
   wherein the first floating sub-trace is disposed in the left direction with respect to the first sub-trace;
   the second floating sub-trace is disposed in the right direction with respect to the second sub-trace; and
   the first floating sub-trace and the second floating sub-trace are spaced apart from each other with the first sensing electrode row, the second sensing electrode row, the first sub-trace and the second sub-trace therebetween.

10. The method according to claim 9, wherein a plurality of the first floating sub-traces arranged along the left direction with respect to the first sub-trace are formed by the patterning process, and a plurality of the second floating sub-traces arranged along the right direction with respect to the second sub-trace are formed by the patterning process.

11. A method of manufacturing a touch sensor, the method comprising:

forming a first sensing electrode row, a second sensing electrode row, a first sub-trace extending from a left end of the first sensing electrode row, a first floating sub-trace disposed around the first sub-trace, a second sub-trace extending from a right end of the second sensing electrode row and a second floating sub-trace disposed around the second sub-trace on a substrate layer by a patterning process using a photo-mask; and repeating the patterning process by moving the photo-mask, wherein a plurality of the first floating sub-traces arranged along a left direction with respect to the first sub-trace are formed by the patterning process, and a plurality of the second floating sub-traces arranged along a right direction with respect to the second sub-trace are formed by the patterning process, wherein a first sub-trace formed in an nth patterning process is connected to a first floating sub-trace adjacent to the first sub-trace among first floating sub-traces formed in an n+1th patterning process, and n is an integer greater than or equal to 2.

12. The method according to claim 10, wherein a first floating sub-trace adjacent to the first sub-trace among first floating sub-traces formed in an nth patterning process is connected to an outermost first floating sub-trace among first floating sub-traces formed in an n+1th patterning process, and n is an integer greater than or equal to 2.

13. The method according to claim 10, wherein a second sub-trace formed in an nth patterning process is connected to a second floating sub-trace adjacent to the second sub-trace among second floating sub-traces formed in an n+1th patterning process, and n is an integer greater than or equal to 2.

14. The method according to claim 10, wherein a second floating sub-trace adjacent to the second sub-trace among second floating sub-traces formed in an nth patterning process is connected to an outermost second floating sub-trace among second floating sub-traces formed in an n+1th patterning process, and n is an integer greater than or equal to 2.

15. The method according to claim 10, wherein sensing column electrodes spaced apart from each other are further formed between the first sensing electrode row and the second sensing electrode row by the patterning process.

16. A window stack structure, comprising:
a window substrate;
the touch sensor according to claim 1 stacked on the window substrate; and
a polarizing layer between the window substrate and the touch sensor or disposed on the touch sensor.

17. An image display device, comprising:
a display panel; and
the touch sensor according to claim 1 stacked on the display panel.

* * * * *